US006194714B1

(12) United States Patent
Maitrejean et al.

(10) Patent No.: US 6,194,714 B1
(45) Date of Patent: Feb. 27, 2001

(54) METHOD OF PROCESSING AUTORADIOGRAPHY IMAGE

(75) Inventors: Serge Maitrejean; Bernhard Sandkamp; Claude Hennion, all of Paris (FR)

(73) Assignee: Biospace Instruments, Paris (FR)

( * ) Notice: Subject to any disclaimer, the term of this patent is extended or adjusted under 35 U.S.C. 154(b) by 0 days.

(21) Appl. No.: 09/209,487

(22) Filed: Dec. 11, 1998

(30) Foreign Application Priority Data

Dec. 12, 1997 (FR) .................................. 97 15764

(51) Int. Cl.$^7$ ................................. G01T 1/29; G01T 5/00
(52) U.S. Cl. ....................... 250/252.1; 250/374; 250/375; 250/370.08; 250/370.06; 250/370.1; 250/370.11; 250/371
(58) Field of Search ................................ 250/252.1, 328, 250/363.09, 366, 367, 369, 370.01, 370.02, 370.06, 370.08, 370.1, 370.11, 371, 374, 375, 385.1

(56) References Cited

U.S. PATENT DOCUMENTS

| | | |
|---|---|---|
| 4,332,784 | 6/1982 | Smith et al. . |
| 4,466,951 | 8/1984 | Pittman . |
| 4,855,598 | 8/1989 | Ohgoda et al. . |
| 5,025,162 | * 6/1991 | Charpak ............................ 250/385.2 |
| 5,347,129 | * 9/1994 | Miller et al. ........................ 250/336.1 |
| 5,347,139 | 9/1994 | Barker et al. . |
| 5,596,201 | 1/1997 | Charpak . |
| 5,828,067 | * 10/1998 | Rushbrooke et al. ........... 250/370.11 |
| 5,866,907 | * 2/1999 | Drukier et al. ...................... 250/366 |

FOREIGN PATENT DOCUMENTS

| | | |
|---|---|---|
| 0 377 095 | 7/1990 | (EP) . |
| 0 615 274 A1 | 9/1994 | (EP) . |
| 2 311 198 | 9/1997 | (GB) . |

OTHER PUBLICATIONS

Zanevsky et al., "Use of a Proportional Chamber for Quantitative and Qualitative Analysis of Thin-Lay Radiochromatograms", Nuclear Instruments and Methods 153 (1978) 445–447.

Yumane et al., "Quantitative Double-Tracer Autoradiography with Tritium and Carbon-14 Using Imaging Plate: . . . ", The Journal of Nuclear Medicine, vol. 36, No. 3, Mar. 1995.

Bellazzini et al., "Multitracer Digital Autoradiography with MWPCs", IEEE Transactions on Nuclear Science, vol. NS–32, No. 1, Feb. 1985.

Lainece et al., "Research Reports—HRRI: A High Resolution Radioimager for Fast, Direct Quantification in In Situ Hybridization Experiments", vol. 17, No. 2 (1994), pp. 338–345.

Kubota et al., "Detection of Cardiomyopathy in an Animal Model Using Quantitative Autoradiograph", The Journal of Nuclear Medicine, vol. 29, No. 10, Oct. 1988, pp. 1697–1703.

Yonekura et al., "Quantitative Autoradiography with Radiopharmaceuticals, Part 1: Digital Film-Analysis by Videodensitometry: Concise Communication", The Journal of Nuclear Medicine, vol. 24, No. 3, pp. 231–237.

* cited by examiner

Primary Examiner—Constantine Hannaher
Assistant Examiner—Albert Gagliardi
(74) Attorney, Agent, or Firm—Larson & Taylor

(57) ABSTRACT

This is a method of generating a plurality of images of a substrate from radioactive radiation coming from a plurality of radioactive tracers contained in the substrate. To this end, data representing the different detection signals generated by a detector are memorised, individually for each radioactive emission detected during a certain observation period, then statistical processing of these data is carried out in such a way as to estimate the images of the different tracers which correspond best to the set of memorised data.

10 Claims, 1 Drawing Sheet

METHOD OF PROCESSING AUTORADIOGRAPHY IMAGE

FIELD OF THE INVENTION

The present invention relates to methods of processing autoradiography images (autoradiography as such in beta radiation, scintigraphy in gamma radiation etc.), i.e. to methods which make it possible to obtain at least one image from radioactive radiation emitted by at least one radioactive tracer contained in a substrate.

BACKGROUND OF THE INVENTION

More particularly the invention relates to a method of generating at least one image of a substrate from radioactive radiation coming from a number I at least equal to 2 radioactive sources, these radioactive sources comprising at least one radioactive tracer contained in the substrate, this method comprising the following stages:

a) the radioactive radiation emitted by the substrate is detected in a certain observation field sub-divided into K×L pixels, by means of a detector which generates for each pixel $(x_k, y_1)$ of the observation field a detection signal $f(x_k, y_1)$ representing the detection or non-detection of a radioactive emission in this pixel, b) and the data representing the different detection signals generated by the detector are memorised, individually for each radioactive emission detected during a determined period called the observation period, these memorised data corresponding at least to an estimated position of an emission point of radioactive radiation in the substrate.

The use has already been suggested of a method of this type for generating, using an apparatus for imaging with a solid scintillator (marketed under the trade name "µ-imager" by the company BIOSPACE MESURES, Paris, France), two images corresponding respectively to the distribution in the substrate of two different tracers ($^{35}S$ and $^{32}P$) emitting radiation with different energy spectra; by using separation criteria of these emissions (such as the number of pixels affected by a detection, the maximum amplitude of the detection signal for a detection, the sum of the amplitudes of the detection signals for the same detection, etc.), each detection is classified more or less in real time as corresponding either to one tracer, or to the other (see the thesis of P. Laniece: "Quantization in hybridization in situ and in autoradiography: development of a high resolution radio-imager", Institut de Physique Nucléaire, 1992 and Y. Charon: "Radio-imaging and biology", thesis of the UniversitéDenis Diderot,—Paris VII, 1995). In this case, the emission point of each radiation detected is likewise estimated, more or less in real time, at the same time as this radiation is attributed to one or the other of the tracers, and each of the images finally generated consists simply in the superposition of the estimated emission points of the different radiation detected, respectively for each tracer.

OBJECTS AND SUMMARY OF THE INVENTION

The purpose of the present invention is particularly to perfect the known methods of the above-mentioned type in order to improve the definition of the image. To this end, according to the invention, a method of the type in question is essentially characterised in that the data memorised during the period of observation additionnally correspond to a number q at least equal to 1 of supplementary numerical parameters A1 . . . Aq relative to the detection signals generated by each detection of radioactive radiation, each of these parameters, called "criteria", being able to take a non-zero number of values $A1_1 \ldots$ to $A1_{j1}, \ldots, Aq_1 \ldots Aq_{jq}$, called "characteristics", in that before the observation period (a single time only, at regular time intervals, or before each new observation period or series of observation periods), a preliminary calibration stage is implemented, in which an impulse response is measured $Ri, j1, \ldots jq(x,y)$ of the detector for each radioactive source i and for each possible combination of the characteristics $A1_{j1}, \ldots, Aq_{jq}$ of the different criteria $A1 \ldots Aq$, this impulse response corresponding to a probability that, when the detector receives radiation coming from a point source of the aforementioned radioactive source, said detector generates on the pixels of the observation field having the relative coordinates (x,y) in relation to the point source, a detection signal presenting said combination of characteristics, and in that said method comprises the following supplementary stages:

c) from the set of memorised data, determining a distribution $H(x_k, y_1, A1_{j1}, \ldots, Aq_{jq})$ of the detections corresponding to these data, corresponding to the number of detections at each estimated emission point of coordinates $(x_k, y_1)$ with each combination $A1_{j1}, \ldots, Aq_{jq}$ of the characteristics of the different criteria, d) and estimating a distribution h'i(xk,yl) of detections corresponding to each radioactive source i, which minimises the respective deviations between the distribution $H(x_k, y_1, A_{j1}, \ldots, A_{jq})$ and the corresponding values:

$$H'(xk, yl, A1, j1, \ldots Aqjq) = \sum_i h'i(xk, yl) \otimes Ri, j1, \ldots jq(x, y),$$

where:

$$h'i(xk, yl) \otimes Ri, j1, \ldots jq(x, y) = \sum_m \sum_n h'i(xk, yl).$$

$$Ri, j1, \ldots jq(xk-xm, yl-yn),$$

i being an integer between 1 and I, and referring to the radioactive source being considered, j1 being an integer between 1 and J1, referring to the j1st characteristic possible for the criterion no. 1,

. . .

jq being an integer between 1 and Jq referring to the $jq^{th}$ characteristic possible for the criterion no. q, m being an index between 1 and L, n being an index between 1 and K, the distributions h'i(xk,yl) corresponding, for each radioactive source i constituted by a tracer contained in the substrate, to the image of the distribution of this tracer in said substrate.

Thanks to these arrangements, all the information contained in the history of the detections carried out during the observation period is taken into account, in order to obtain an image with excellent resolution.

In preferred embodiments of the invention, one can possibly have recourse in addition to one or other of the following arrangements:

- the radioactive sources comprise a plurality of tracers, to which as many distributions h'i(xk,yl) correspond, each forming the image of the distribution of one of said tracers in the substrate;
- one of the radioactive sources is a background radiation;
- at least one of the radioactive sources is an imaginary source corresponding to at least one defect of the detector;

the detector is a gas detector in which the gamma radiation generates avalanches of electrons on the basis of the detection signal, and said detector comprising hot spots constituted by spots in which are generated avalanches of electrons without detection of beta radiation, these hot spots constituting the imaginary source mentioned above;

each distribution $h'i(xk,yl)$ is estimated by minimising an error function Er defined by:

$$Er = \sum_{j1} \lambda_{j1} \ldots \sum_{jq} \lambda_{jq}$$

$$\sum_{k}\sum_{l}\left[H(x_k, y_l, AI_{j1}, \ldots, Aq_{jq}) - \sum_{i} h'i(x_k, y_l) \otimes R_{i,j1,\ldots jq}(x, y)\right]^2$$

where $\lambda_{j1} \ldots \lambda_{jq}$ are weighting indices:

the indices $\lambda_{j1} \ldots \lambda_{jq}$ are all equal to 1;

at least one of the criteria is chosen from the group consisting in:
  the maximum amplitude of the detection signal, for each detection,
  the number of pixels affected by each detection, these pixels forming a whole which is called hereinafter "detection spot",
  the ellipticity of the detection spot,
  the sum of the values of the signal detection on the detection spot,
  the variance of the detection spot,
  the narrowness of the detection spot,
  the asymmetry of the detection spot;

the estimated emission point of each detection is the barycentre of the pixels affected by this detection, of co-ordinates:

$$\left(\left[\sum_{m}\sum_{n} x_m \cdot f(x_m, y_n)\right]\bigg/\left[\sum_{m}\sum_{n} f(x_m, y_n)\right], \left[\sum_{m}\sum_{n} y_n \cdot f(x_m, y_n)\right]\bigg/\left[\sum_{m}\sum_{n} f(x_m, y_n)\right]\right)$$

the impulse responses $Ri,j1, \ldots$ to $jq(x,y)$ taken into account are zero except when $(x,y)=(0,0)$.

BRIEF DESCRIPTION OF THE DRAWINGS

Other characteristics and advantages of the invention will appear in the course of the following description of one of its embodiments, given by way of non-restrictive example, with respect to the attached drawings.

On the drawings.

MORE DETAILED DESCRIPTION

The method according to the present invention applies to the processing of autoradiography images, obtained in particular by scintigraphy detectors of gamma radiation, and the autoradiography detectors which are actually detectors of beta radiation, whether these be gas detectors with electronic reading (chamber with wires), gas detectors with optical reading (for example the detectors marketed under the trade name "β-Imager" by the company BIOSPACE MESURES, PARIS, FRANCE), or scintillators (for example the detector using a solid scintillator and commercialised under the trade name "μ-Imager" by the company BIOSPACE MESURES, PARIS, FRANCE), etc.

Figure 1:
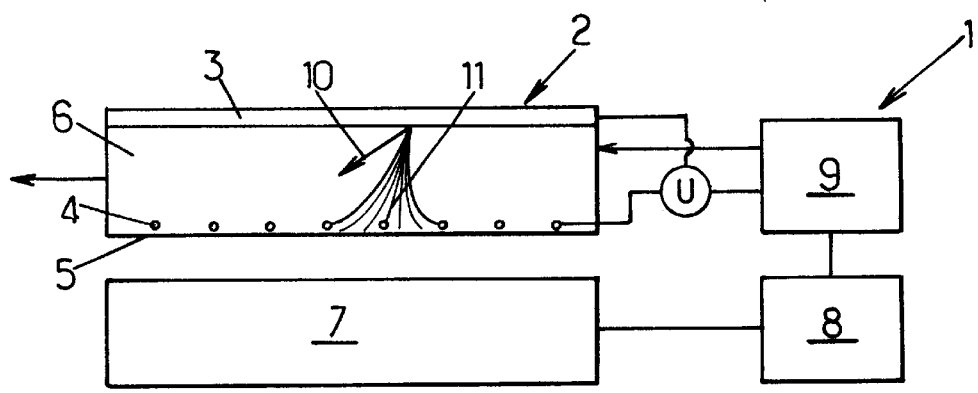
FIG. 1 is a schematic view of a gas detector which can be used for carrying out the method according to the invention.

By way of purely illustrative example, a gas detector with optical reading, of the type marketed under the trade name "β-Imager" by the above-mentioned company BIOSPACE, is represented on FIG. 1.

This detector 1 comprises:

a detection chamber 2, constituted by a closed enclosure defined between two parallel flat electrodes, one constituted by a sample 3 to be analysed and the other by a grid 4 associated with a transparent window 5, these two electrodes being subjected to a high potential difference and the space between the two electrodes (or observation field) being travelled through by a gaseous flux constituted for example by a mixture of argon and triethylamine, an intensified camera 7 disposed opposite the window 5 of the detection chamber, a microcomputer 8 connected with the intensified camera to obtain images taken by this camera, and a control system 9 actuated by the microcomputer, to control in particular the gaseous flux in the detection chamber 2 as well as the potential difference between the sample 3 and the grid 4.

The sample 3, which will be called hereinafter substrate, can for example be constituted by a fine slice of a biological organism in which one hopes to map the distribution of one or a plurality of tracers, (to the number of I) constituted by radioactive isotopes such as:

$^3H$, $^{14}C$, $^{35}S$, $^{32}P$, $^{33}P$ and $^{125}I$

Assuming for example that the substrate contains two isotopes, for example of tritium and of carbon 14, these two tracers each emit beta radiation in the detection field 6, with different energy spectra.

Each beta emission 10 ionises argon atoms in the detection field, and the electrons thus released are accelerated by the electric field between the two electrodes 3, 4 ionising in turn other argon atoms, which generates a phenomenon called "electronic avalanche" 11.

This electronic avalanche excites the triethylamine contained in the gaseous flux, which emits light detected by the intensified camera 7, and the microcomputer 8 thus obtains the image of each detection of beta radiation, distributed in K×L pixels.

Each pixel of the image thus acquired has therefore co-ordinates $(X_k,y_1)$ where k is an integer between 1 and K and l is an integer between 1 and L.

Thus each detection of a beta emission by the detector 2 is translated by the acquisition in the microcomputer 8 of an image, some pixels of which, for example 50 pixels, present a luminous intensity greater than a pre-determined threshold, these pixels forming a detection spot.

Figure 2:
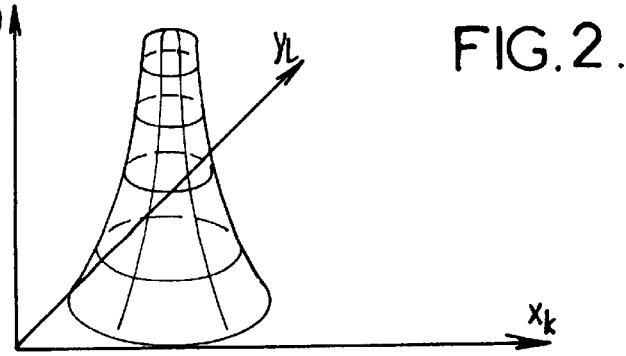
FIG. 2 is a schematic view of an example of a detection signal $f(x_k,y_1)$ obtained during the detection of beta radiation in the detector of FIG. 1.

The luminous intensity of each pixel, picked up by the camera 7, constitutes a detection signal $f(x_k,y_1)$, of which one purely illustrative example is represented on FIG. 2.

Each image of detection of beta radiation acquired by the microcomputer 8 corresponds either to radiation emitted by the tritium, or to radiation emitted by the carbon 14.

On the basis of the different energy spectra of these two radioactive tracers, thie shape of the above-mentioned function $f(x_k, y_1)$ varies statistically according to whether the emitted radiation comes from the tritium or from the carbon 14.

It is this phenomenon which is used by the present invention in order to map separately the tritium and the carbon 14 in the substrate 3, i.e. to generate two images of the substrate 3, one corresponding to the distribution of the tritium in this substrate, and the other to the distribution of the carbon 14 in this substrate.

To this end, one or more distinction criteria are used relative to the shape of the detection signal $f(x_k, y_1)$, such as:

the maximum amplitude of the detection signal, i.e. the maximum value of $f(x_k, y_1)$ for each detection, the number of pixels affected by each detection, the ellipticity e of each detection spot, defined by the formula $e = ABS\,(A^2-B^2)/(A^2+B^2)$, where A and B are the dimensions of the detection spot according to its two principle axes, i.e. according to its length and its width, the sum of the values of the detection signal $f(x_k, y_1)$ on the whole of the detection spot, for each detection, the variance of the detection spot, according to its two principle axes, the variance V according to the principle axis A being expressed for example in the form:

$$V = \left(\sum_{pixels} f(a,b) \cdot (a - \bar{a})^2 \right) \Big/ \sum_{pixels} f(a,b),$$

where a and b are the coordinates of each pixel affected by the detection under consideration according to the principle axes A and B, $\bar{a}$ is the average value of a for these pixels, and $\sigma$ is the standard deviation, the asymmetry of the detection spot, according to its two principle axes, the asymmetry according to the principle axis A being expressed for example in the form:

$$A_{SS} = \left(\sum_{pixels} f(a,b) \cdot (a - \bar{a})^3 / \sigma^3 \right) \Big/ \sum_{pixels} f(a,b),$$

and the narrowness of the detection spot, given by the formula $$E = \left(\sum_{pixels} f(a,b) \cdot (a - \bar{a})^4 / \sigma^4 \right) \Big/ \sum_{pixels} f(a,b),$$

(it is equally possible to use instead of narrowness the coefficient called kurtosis $K = E - 3$).

By way of example, it is possible to evaluate for each detection the maximum amplitude of the signal detection f and the ellipticity of the detection spot.

Thus, on each detection of beta radiation, the microcomputer 8 calculates, more or less in real time:

the values taken by the above-mentioned criteria, values which are made discrete and which will be called hereinafter "characteristics", as well as the barycentre of the detection spot, corresponding to the estimated emission point of the beta radiation in the substrate 3, this having as coordinates:

$$\left(\left[\sum_m \sum_n x_m \cdot f(x_m, y_n)\right] \Big/ \left[\sum_m \sum_n f(x_m, y_n)\right], \sum_m \sum_n y_n \cdot f(x_m, y_n) \Big/ \left[\sum_m \sum_n f(x_m, y_n)\right]\right)$$

The microcomputer therefore conserves in its memory, individually for each emission detected, the different data thus calculated, but it does not necessarily keep in its memory the detection signal $f(x_k, y_1)$ in order to save space in the memory.

When the microcomputer 8 has stored a sufficient number of detections, typically several million, for example approximately 3 million, it has available a statistical distribution $H(x_k, y_1, A1_{j1}, \ldots Aq_{jq})$, where:

q is the number of criteria used, $A1_{j1}$ is the value (or characteristic), taken by the criterion no. 1, j1 being between 1 and J1,

. . .

$Aq_{jq}$ is the value (characteristic) taken by the criterion no. q, jq being between 1 and Jq.

This distribution $H(x_k, y_1, A1_{j1}, \ldots, Aq_{jq})$ corresponds to the number of detections at each estimated emission point (barycentre of each detection spot) of coordinates $(x_k, y_1)$ with each combination $A1_{j1}, \ldots, Aq_{jq}$ of the characteristics of the different criteria.

Figure 3:
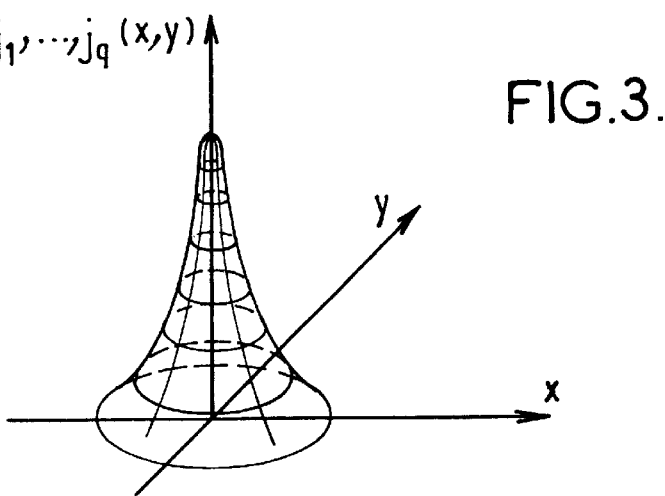
FIG. 3 is a schematic view of an example of impulse response $Ri,j1, \ldots jq(x,y)$ which can be used in the implementation of the method according to the invention.

The distribution H can be expressed in the form:

$$(I)\, H(xk, yl, Al_{j1}, \ldots Aq_{jq}) = \sum_i hi(xk, yl) \otimes R_{i,j1,\ldots jq}(x,y),$$

where:

$$hi(xk, yl) \otimes R_{i,j1,\ldots jq}(x,y) = \sum_m \sum_n hi(xk, yl) \cdot R_{i,j1,\ldots jq}(xk - xm, yl - yn)$$

i being an integer between 1 and I, referring to the radioactive tracers, m being an index between 1 and L, n being an index between 1 and K, and $Ri, j1, \ldots jq(x,y)$ being the impulse response of the detector for each tracer i and for each possible combination of the characteristics $Ac_{j1}, \ldots, Aq_{jq}$ of the different criteria $A1 \ldots Aq$, this impulse response corresponding to a probability that, when the detector receives radiation coming from a point source of the radioactive tracer i, said detector generates on the pixels of the observation field having the relative coordinates (x,y) in relation to the point source, a detection signal presenting said combination of characteristics (see the example represented in FIG. 3), and said impulse response being measured in a preliminary calibration stage implemented before the period of observation of the substrate 3 (a single time only, at regular time intervals, or before each new observation period or series of observation periods).

In the course of the calibration stage, the impulse responses can be estimated by carrying out successive measures with point sources of the different tracers i, (for example circular sources which present a diameter lower than or equal to 100 $\mu$m), and in calculating:

$$R_{i,j1,\ldots jq}(x, y) = N_i(x, y, A1_{j1}, \ldots Aq_{jq}) \Big/ \left( \sum_{s1} \ldots \sum_{sq} N_i(x, y, A1_{s1}, \ldots Aq_{sq}) \right)$$

where Ni(x,y,A1j1, ... Aqjq) is the number of detections at the point of relative coordinates (x,y) in the course of the calibration stage carried out with the tracer i and with the combination of characteristics $A1_{j1}, \ldots, Aq_{jq}$.

From the distribution H the microcomputer 8 estimates the distributions h'i(xk,yl) for each radioactive tracer, corresponding respectively to the image of the distribution of these tracers in the substrate 3.

For this, the microcomputer 8 minimises the deviation between the distribution H(xk,yl,A1j1, ... Aqiq) and an estimated distribution $$H'(x_k, y_l, A1_{j1}, \ldots Aq_{jq}) = \sum_i h'_i(x_k, y_l) \otimes R_{i,j1,\ldots jq}(x, y)$$

For this, it is possible to minimise an error function Er, for example, in accordance with the method of the least squares:

$$Er = \sum_{j1} \lambda_{j1} \ldots \sum_{jq} \lambda_{jq}$$

$$\sum_k \sum_l \left[ H(x_k, y_l, A1_{j1}, \ldots, Aq_{jq}) - \sum_i h'i(x_k, y_l) \otimes R_{i,j1,\ldots jq}(x, y) \right]^2$$

where $\lambda_{j1} \ldots \lambda_{jq}$ are weighting indices, which can if necessary all be equal to 1.

This minimisation can be done by direct calculation, or by standard numerical analysis algorithms, starting from an arbitrary value of the distributions h'i(xk,yl).

Thus, estimated distributions h'i(xk,yl) are obtained which are very close to the actual distributions hi(xk,yl), such that images with very good resolution are obtained giving respectively the mapping of the tracers i in the substrate 3.

It will be noted that the method according to the invention can equally be used to eliminate the radioactive background radiation, considering this background radiation as an imaginary radioactive tracer.

Similarly, when the dectector 1 includes point defects, generally called "hot spots" in gas dectectors, it is likewise possible to eliminate the effect of these hot spots or other defects by considering them as imaginary tracers.

Finally, the method according to the invention can be implemented in a simplified form, by only taking into account the impulse responses for (x,y)=(0,0), in which case the above-mentioned equation I is simplified and becomes:

$$(Ibis) H(xk, yl, A1_{j1}, \ldots Aq_{jq}) = \sum_i hi(xk, yl) \cdot R_{i,j1,\ldots jq},$$

the method being moreover carried out in the same fashion as explained before.

The present invention is not limited to the particular example which has just been described. In particular, it encompasses the case where analogical measures are carried out on the image, which would amount to increasing to infinity the number of pixels: in this case the discreet amounts explained above on the x and y axes could be presented in the form of continuous integrals.

We claim:

1. A method of generating at least one image of a substrate from radioactive radiation coming from a number I at least equal to 2 of radioactive sources, these radioactive sources comprising at least one radioactive tracer contained in the substrate, this method comprising the following stages:

a. the radioactive radiation coming from the substrate is detected in a certain observation field sub-divided into K×L pixels, by means of a detector which generates for each pixel $(x_k, y_l)$ of the observation field a detection signal $f(x_k, y_l)$ representing the detection or non-detection of a radioactive radiation in this pixel, b. and data representing different detection signals generated by the detector are memorised, individually for each radioactive emission detected during a determined period called the observation period, these memorised data corresponding at least to an estimated position of an emission point of the radioactive radiation in the substrate, wherein the data memorised during the observation period additionally correspond to a number q at least equal to 1 of supplementary numerical parameters A1 ... Aq relative to the detection signals generated by each detection of radioactive radiation, each of these parameters, called "criteria", being able to take a non-zero number of values $A1_1 \ldots A1_{j1\text{-}}, \ldots A_q \ldots Aq_{jq}$, termed "characteristics", wherein before the observation period, a preliminary calibration stage is implemented in which an impulse response Ri,j1, ... jq(x,y) of the detector is measured for each radioactive source i and for each possible combination of the characteristics $A1_{j1}, \ldots, Aq_{jq}$ of the different criteria A1 ... Aq, this impulse response corresponding to a probability that, when the detector receives radiation coming from a point source of the aforementioned radioactive source, said detector generates on the pixels of the observation field having the relative coordinates (x,y) in relation to the point source, a detection signal presenting said combination of characteristics, and said method comprising the following supplementary stages:

c. from the set of memorised data, determining a distribution $H(x_k, y_l, A1_{j1} \ldots, Aq_{jq})$ of the detections corresponding to these data, corresponding to the number of detections at each estimated emission point of coordinates $(x_k, y_l)$ with each combination $A1_{j1}, \ldots, Aq_{jq}$ of the characteristics of the different criteria, d. and estimating a distribution h'i(xk, yl) of detections corresponding to each radioactive source i, which minimises the respective deviations between the distribution $H(x_k, y_l, A_{j1}, \ldots A_{jq})$ and the corresponding values:

$$H'(xk, yl, A1, j1, \ldots Aqjq) = \sum_i h'i(xk, yl) \otimes Ri, j1, \ldots jq(x, y),$$

where:

$$h'i(xk, yl) \otimes Ri, j1, \ldots jq(x, y) = \sum_m \sum_n h'i(xk, yl \cdot Ri, j1, \ldots jq(xk-xm, yl-yn),$$

i being an integer between 1 and I, referring to the radioactive source being considered, j1 being an integer between 1 and J1, referring to the j1$^{st}$ characteristic possible for the criterion no. 1, jq being an integer between 1 and Jq referring to the jq$^{th}$ characteristic possible for the criterion no. q, m being an index between 1 and L, n being an index between 1 and K, the distributions h'i(xk,yl) corresponding, for each radioactive source i constituted by a tracer contained in the substrate, to the image of the distribution of this tracer in said substrate.

2. Method according to claim 1, in which the radioactive sources comprise a plurality of tracers, to which correspond as many distributions h'i(xk,yl), each forming the image of the distribution of one of said tracers in the substrate.

3. Method according to claim 1, in which one of the radioactive sources is a background radiation.

4. Method according to claim 1, in which at least one of the radioactive sources is an imaginary source corresponding to at least one defect of the detector.

5. Method according to claim 4, in which the detector is a gas detector in which the beta radiation generates electron avalanches on the basis of the detection signal, and said detector comprising hot spots constituted by spots at which electron avalanches are generated without detection of beta radiation, these hot spots constituting the above-mentioned imaginary source.

6. Method according to claim 1, in which each distribution h'i(xk,yl) is estimated minimising an error function Er defined by:

$$Er = \sum_{j1} \lambda_{j1} \ldots \sum_{jq} \lambda_{jq}$$

$$\sum_{k}\sum_{l}\left[H(x_k, y_l, A1_{j1}, \ldots, Aq_{jq}) - \sum_{i} h'i(x_k, y_l) \otimes R_{i,j1,\ldots jq}(x, y)\right]^2$$

where $\lambda_{j1} \ldots \lambda_{jq}$ are weighting indices.

7. Method according to claim 6, in which the indices $\lambda_{j1} \ldots \lambda_{jq}$ are all equal to 1.

8. Method according to claim 1, in which at least one of the criteria is chosen from:

the maximum amplitude of the detection signal, for each detection, the number of pixels affected by each detection, these pixels forming a whole which is called hereinafter "detection spot", the ellipticity of the detection spot, the sum of the values of the detection signal on the detection spot, the variance of the detection spot, the narrowness of the detection spot, the asymmetry of the detection spot.

9. Method according to claim 1, in which the estimated emission point of each detection is the barycentre of the pixels affected by this detection, of coordinates:

$$\left(\left[\sum_{m}\sum_{n} x_m \cdot f(x_m, y_n)\right] \Big/ \left[\sum_{m}\sum_{n} f(x_m, y_n)\right],\right.$$

$$\left.\sum_{m}\sum_{n} y_n \cdot f(x_m, y_n)\right] \Big/ \left[\sum_{m}\sum_{n} f(x_m, y_n)\right]\right).$$

10. Method according to claim 1, in which the impulse responses Ri,j1, . . . jq(x,y) taken into account are zero apart from when (x,y)=(0,0).

* * * * *